United States Patent [19]

Goiset

[11] 4,419,588
[45] Dec. 6, 1983

[54] SECURITY ELECTRICAL POWER DISTRIBUTION SYSTEMS FOR LIGHT AIRCRAFT EQUIPPED FOR FLIGHT ON INSTRUMENTS

[75] Inventor: Jean-Pierre Goiset, Saint-Maur-des-Fossés, France

[73] Assignee: Les Modeles Francais, Saint-Maur, France

[21] Appl. No.: 340,860

[22] Filed: Jan. 20, 1982

[30] Foreign Application Priority Data

Jan. 20, 1981 [FR] France ................................. 81 00940

[51] Int. Cl.³ .............................................. H02J 9/06
[52] U.S. Cl. ......................................... 307/9; 307/18; 361/66
[58] Field of Search ....................... 361/62, 63, 65, 66, 361/86; 307/9, 10 R, 34, 18, 20, 21, 23, 29, 66, 87, 19; 322/7, 8

[56] References Cited

U.S. PATENT DOCUMENTS 2,832,896 4/1958 Stineman et al. ...................... 307/87
3,041,465 6/1962 Ayre .
3,379,893 4/1968 Cavanaugh ........................ 307/34 X

FOREIGN PATENT DOCUMENTS 1690468 6/1971 Fed. Rep. of Germany .
1306808 11/1961 France .
612345 6/1978 U.S.S.R. ................................. 307/23
716111 2/1980 U.S.S.R. ................................. 307/29

Primary Examiner—Harry E. Moose, Jr.
Attorney, Agent, or Firm—Spencer & Frank

[57] ABSTRACT

A security electrical power distribution system for light aircraft equipped for flight on instruments and having at least one navigation system comprising a main instrument and a standby instrument, comprises a battery and a generator. A battery bus and a generator bus are connected to respective instruments of the or each navigation system. A remote-controlled circuit-breaker interconnects these buses. A fault detector has two control inputs connected to respective terminals of the circuit-breaker. It also has one power feed input connected to the battery and another power feed input connected to the generator. The system also includes a single fault indicator and a module monitoring the generator output voltage. The fault indicator is operative in response to input from the fault detector or the monitor module.

8 Claims, 5 Drawing Figures

SECURITY ELECTRICAL POWER DISTRIBUTION SYSTEMS FOR LIGHT AIRCRAFT EQUIPPED FOR FLIGHT ON INSTRUMENTS

BACKGROUND OF THE INVENTION

1. Field of the Invention

The present invention concerns security electrical power distribution systems for light aircraft equipped for flight on instruments.

2. Description of the Prior Art

Currently, the electrical power supply for the instrument panel of a light aircraft is of the same type as in a terrestial automotive vehicle, comprising a 12 or 24 Volt battery and a generator (alternator) driven by the motor. This combination is generally connected to a distribution bus to which the various navigation and radio equipments are connected. This arrangement is used in aircraft equipped for flight on instruments (in zero visibility).

While navigation and radio instruments are duplicated for reasons of security, this is not the case with the electrical power distribution system, which is normally provided by a single bus. The potential hazards of this situation are readily apparent. In the event of a fault such as a short-circuit at or failure of the generator, the aircraft may find itself without power for its flight instruments, in the longer or shorter term. Although the aircraft can continue to fly without an electrical power supply to its instrument panel, such a failure presents two types of hazard. The first is that of loss of use of navigation systems. The second is due to the fact that light aircraft equipped for flight on instruments are increasingly using the air lanes used by large commercial aircraft, with the attendant risk of a mid-air collision.

Should a fault occur in the generator, battery or main distribution bus, the pilot needs to know as soon as possible and to continue to have power available for sufficient time to shorten or terminate the flight.

SUMMARY OF THE INVENTION

To this end, the invention consists in a security electrical power distribution system for light aircraft equipped for flight on instruments and having at least one navigation system comprising a main instrument and a standby instrument, said power distribution system comprising a battery, a generator, a battery bus and a generator bus connected to respective instruments of each navigation system, a remote-controlled circuit-breaker interconnecting said buses, and a fault detector with two control inputs connected to respective terminals of said circuit-breaker, one power feed input connected to said battery and another power feed input connected to said generator.

This system has the advantage of isolating a fault as soon as it occurs and enabling the pilot to determine the type of fault. As each navigation instrument and the radio are duplicated, the aircraft can continue to fly in all cases on those instruments which are still connected to a power feed, irrespective of the source of the fault. Thus if the fault originates in the battery, the aircraft can continue to fly using the navigation instruments and radio connected to the generator bus. On the other hand, if the fault originates in the generator, the aircraft can continue to fly on the instruments connected to the battery bus. In the latter case, the pilot will be aware that the time for which he can continue to use his navigation instruments and radio is limited. On the other hand, if operating from the generator only the pilot knows that his navigation instruments and radio will operate indefinitely, but that he now has no standby equipment. In either case the pilot has the knowledge required to make a decision concerning whether to continue or abort the flight.

Other objects and advantages will appear from the following description of an example of the invention, when considered in connection with the accompanying drawings, and the novel features will be particularly pointed out in the appended claims.

DESCRIPTION OF THE PREFERRED EMBODIMENT

Figure 1:
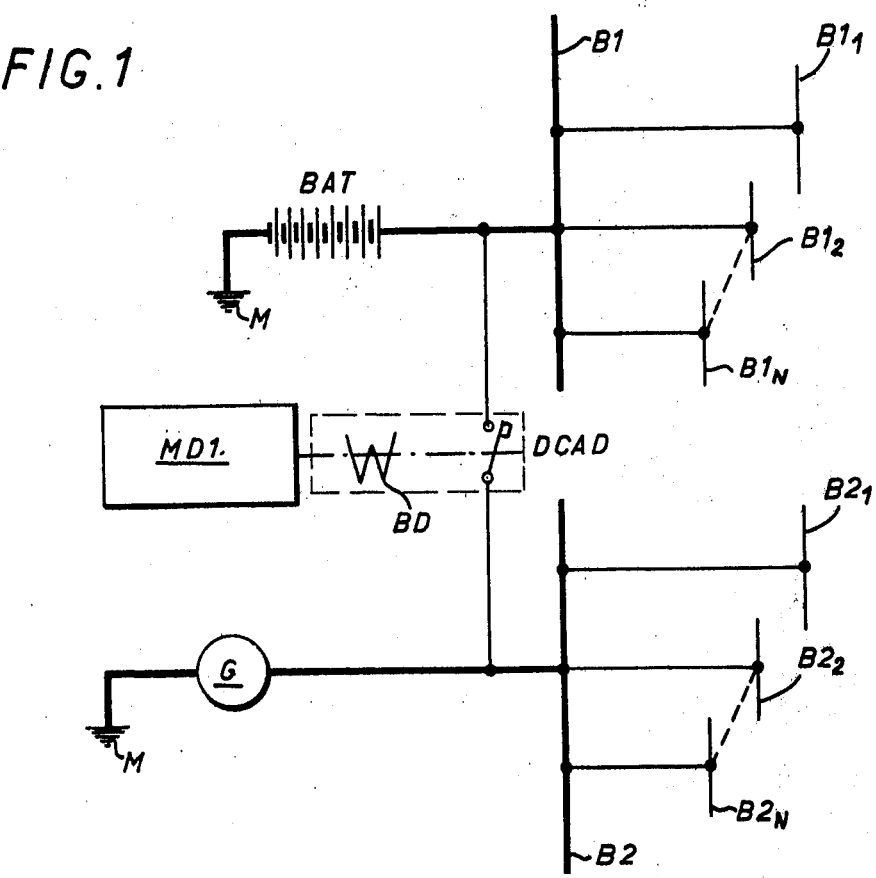
FIG. 1 is a block schematic of the system in accordance with the invention.

Referring to FIG. 1, a battery BAT is connected to a generator G by a remote-controlled circuit-breaker DCAD and a common earthed return M. Distribution buses B1 and B2 are connected to battery BAT and generator G, respectively. Secondary buses $B1_1$, $B1_2$... $B1_N$ and $B2_1$, $B2_2$... $B2_N$ are connected to main buses B1 and B2, respectively. Duplicated navigation instruments (not shown) are connected with the instrument in normal use connected to one of the secondary buses connected to bus B1 or to one of the secondary buses connected to bus B2, and with the standby instrument connected to the other bus.

Circuit-breaker DCAD on the aircraft instrument panel is operated in three ways:

in response to an electrical overload,
by remote energization of its operating coil BD by a detection and control module MD1, the purpose and operation of which will be described later,
manually by the pilot.

Figure 2:
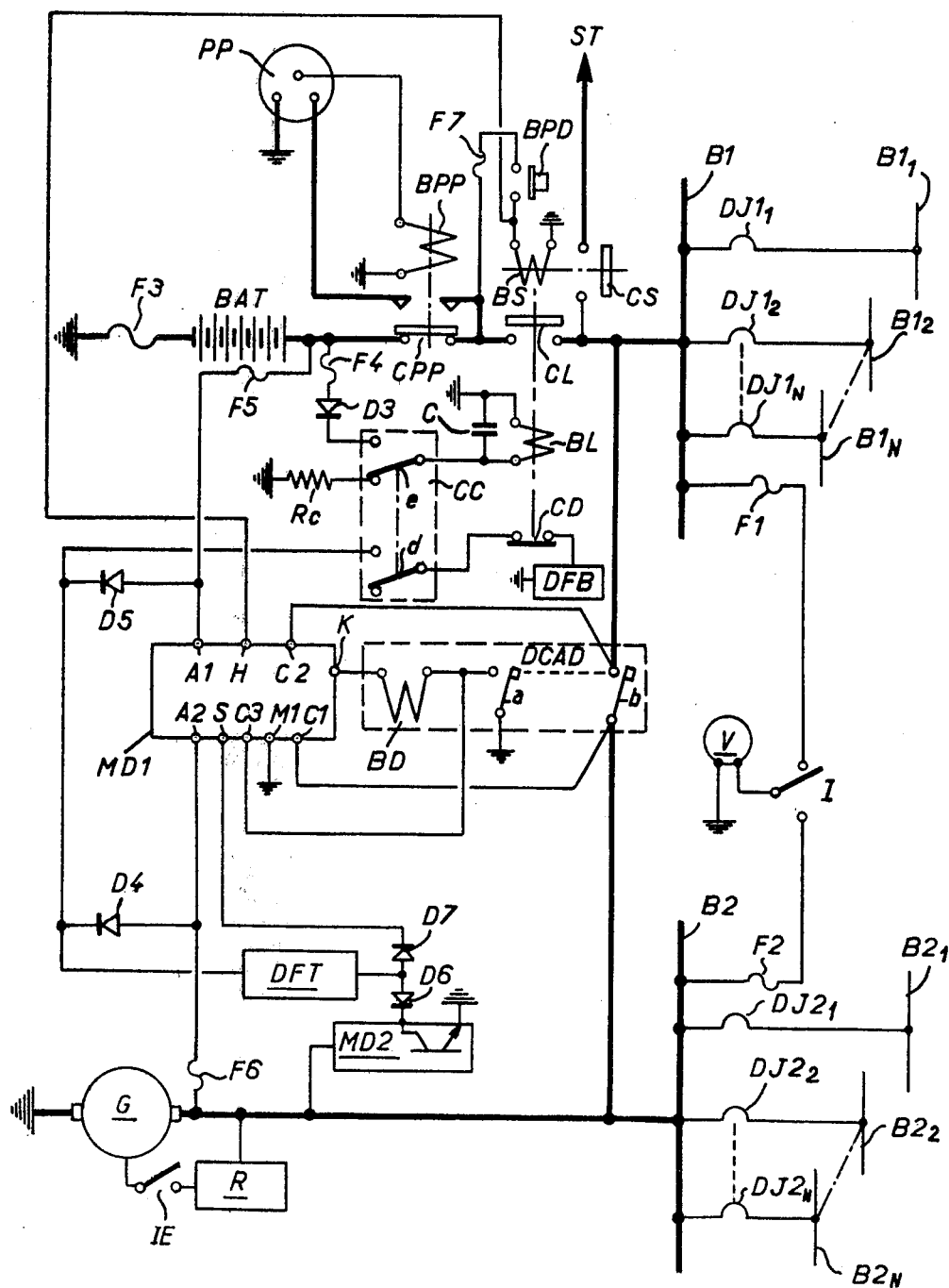
FIG. 2 is a more detailed block schematic of the system in accordance with the invention.

FIG. 2 again shows battery BAT and generator G. A regulator R is connected to generator G through a switch IE which can open-circuit the excitation winding. Also shown in FIG. 2 are buses B1 and B2 to which the aforementioned secondary buses are connected. These secondary buses are connected to the main buses through safety circuit-breakers $DJ1_1$, $DJ1_2$ ... $DJ1_N$ and $DJ2_1$, $DJ1_2$ ... $DJ2_N$. The man skilled in the art will appreciate that this schematic shows the various conventionally used contactors, pushbuttons and connectors, corresponding to the various states of the electrical circuit of the aircraft in flight or on the ground. Ground power connector PP is connected to an external power supply when the aircraft is grounded to energize relay coil BPP to make contact CPP to isolate the battery from distribution buses B1 and B2. A starter coil BS is energized by pressing a starter pushbutton BPD. This makes a starter contact CS to supply power to the motor starter. The electrical connections between starter contact CS and the starter are shown schematically by arrow ST.

A key-operated switch CC has two contacts d and e. Contact e energizes a coil BL through a diode D3 and a protective fuse F4. Coil BL makes a line switch CL and breaks a switch CD to isolate a battery fault indicator DFB, one terminal of which is grounded. Contact d of switch CC is in series with the feed circuit to indicator DFB. This circuit includes a diode D4 and a protective fuse F6 connected to generator G. With the aircraft shut down and the key (not shown) removed from the key-operated switch, contact e of switch CC connects coil BL to ground through a resistor Rc. Contact d opens the feed circuit to indicator DFB. A capacitor C is connected in parallel with coil BL.

A fuse F3 is connected between the battery and ground and additional fuses F1, F2 and F7 protect the various circuits in the usual way.

The detection and control module MD1 has nine terminals:
terminal A2 is connected to generator G,
terminal A1 is connected to the positive pole of battery BAT,
terminal H is connected to starter pushbutton BPD,
terminal S is connected to a fault indicator DFT through a diode D7,
terminal C2 is connected to bus B1,
terminal C1 is connected to bus B2,
terminal C3 is connected to a coil BD operating contacts a and b, these contacts and coil BD constituting the remote-controlled circuit-breaker DCAD,
terminal M1 is connected to ground,
terminal K is connected to coil BD.

Fault indicator DFT is connected to generator G via diode D4 and fuse F6 and to battery BAT via diode D5 and fuse F5.

Fault indicator DFT is also connected to control module MD2 via a diode D6 and to module MD1 via diode D7. Module MD2 is connected to generator G and to bus B2.

Figure 3:
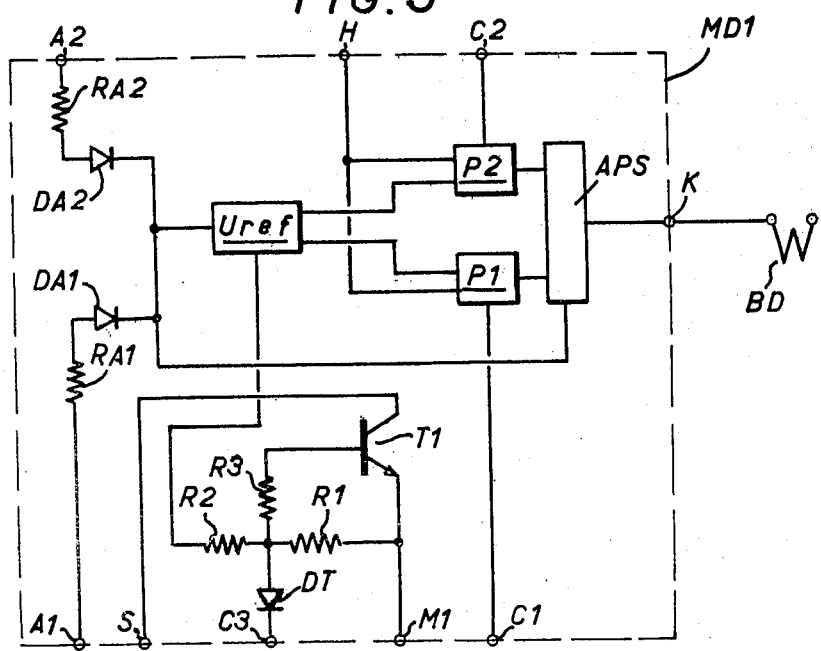
FIG. 3 is a block schematic of a detection and control module in accordance with the invention.

FIG. 3 is a block schematic of one embodiment of module MD1. This module incorporates an output amplifier APS controlling circuit-breaker DCAD. The amplifier is connected to two comparators P1 and P2 which compare the output voltages of buses B1 and B2 with a reference voltage produced by a reference unit $U_{ref}$. Output amplifier APS is connected to the generator and to the battery. Battery BAT is connected to terminal A1 of module MD1 to supply power to amplifier APS through a resistor RA1 and a diode DA1. The amplifier is also connected to receive power from the generator via terminal A2, a resistor RA2 and a diode DA2. Comparators P1 and P2 are disabled when starter pushbutton BPD is operated, this pushbutton being connected to module MD1 via terminal H. A circuit comprising a transistor T1, resistors R1, R2 and R3 and a diode DT controls fault indicator DFT, which may consist of a lamp.

Figure 4:
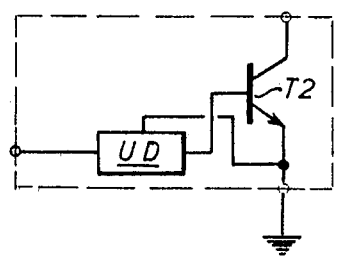
FIG. 4 is a block schematic of a generator voltage monitoring module.

Module MD2 (see FIG. 4) comprises a device UD for detecting a voltage below a predefined threshold (26 volts, for example) and a fault indicator DFT drive circuit comprising a transistor T2. Transistor T2 is controlled by device UD.

Referring again to FIG. 2, a voltmeter V monitors the battery or generator output voltage through a switch I.

In normal operation, with the aircraft in flight and the motor running, contact CPP is in the "break" position, contact CS is open and contact CL is closed. If generator G and regulator R are operating normally, if there is no short-circuit at battery BAT and if there is no fault in the onboard electrical circuit, contacts a and b of remote-controlled circuit-breaker DCAD are closed. In this case, generator G feeds power to bus B1 and bus B2 and charges battery BAT. Fault lamp DFT is off and voltmeter V indicates a normal voltage reading.

The various fault conditions which arise in flight will now be reviewed.

Figure 5:
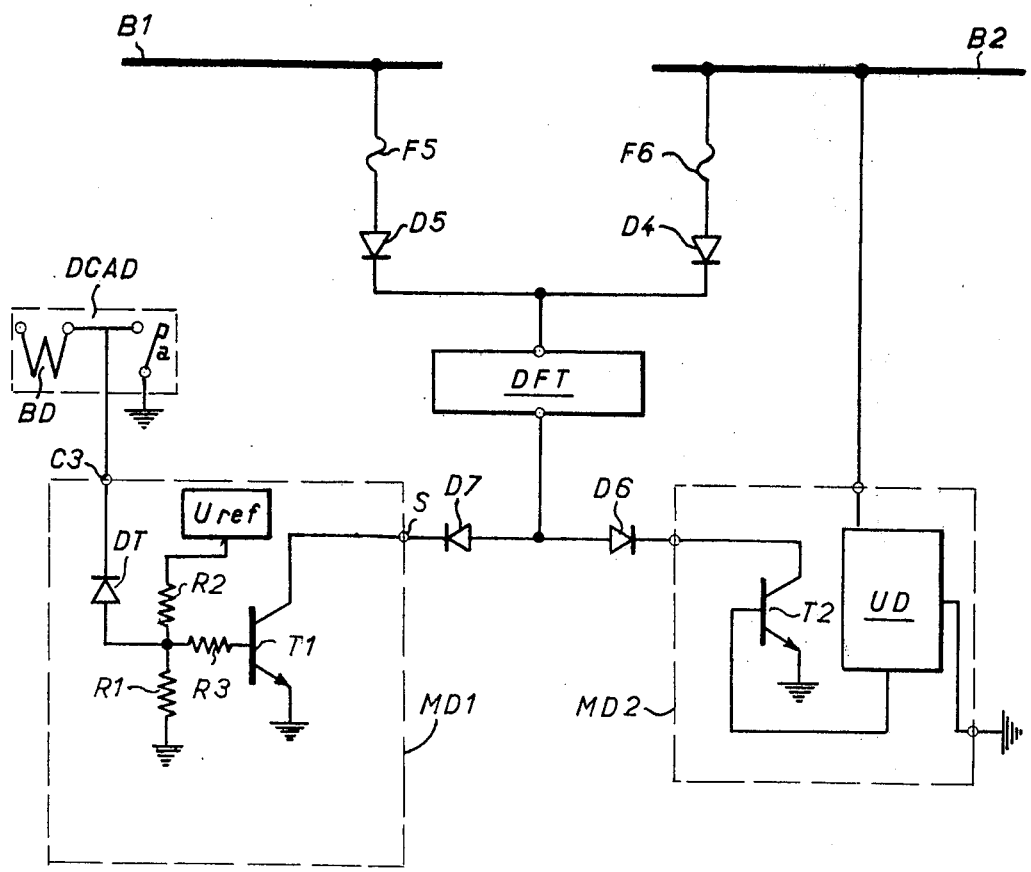
FIG. 5 is a circuit schematic showing various situations in which a "fault" lamp is energized.

Should generator G fail, device UD in module MD2 detects the low-voltage condition. With only battery BAT supplying electrical power, for a nominal battery voltage of 24 V (for example), the voltage drops from approximately 28 V to less than 26 V. Device UD causes transistor T2 to conduct, thus switching on the fault lamp (see FIG. 5, in which the components parts of modules MD1 and MD2 controlling the fault lamp are shown in a schematic intended to facilitate the understanding of this operation). Should this fault occur, provided that the voltage is between 22 V and 26 V the contacts of remote-controlled circuit-breaker DCAD remain closed. Having noted that the fault lamp is on and that remote-controlled circuit-breaker DCAD has not tripped, the pilot knows that a generator fault has occurred, confirmed by the reading on voltmeter V. He then knows that he has approximately 30 minutes flight time remaining, provided that he minimizes the power consumption of his instruments. To this end, the pilot trips circuit-breaker DCAD manually, to disconnect the two buses. This reduces the electrical power consumption of the instrument panel by approximately one-half. If the pilot does not operate circuit-breaker DCAD himself, the voltage will drop more quickly and eventually module MD1 comparators P1 and P2 will detect the critical voltage of 22 V. Circuit-breaker DCAD will then be tripped through output amplifier APS of module MD1.

Should there occur a short-circuit at generator G or in any of the circuits connected to it, including bus B2, the generator is de-excited. As previously, device UD of module MD2 detects the low output voltage from the generator and switches on fault lamp DFT. The short-circuit draws high current from battery BAT, this overload tripping circuit-breaker DCAD, which thus isolates bus B2. Fault lamp DFT remains on since continuity is provided via transistor T2 in module MD2 and via transistor T1, rendered conducting by the opening of contact a of circuit-breaker DCAD (see FIG. 5). The battery continues to supply power to bus B1. The pilot then knows that he has approximately 30 minutes flight time remaining.

If the short-circuit at or in the circuits connected to the generator is one of relatively high impedance, the drop in generator output voltage causes module MD2 to switch on fault lamp DFT. The short-circuit draws current from the battery, but in certain cases the high impedance of the short-circuit may be such that circuit-breaker DCAD does not respond to the overload by tripping. If the pilot fails to trip circuit-breaker DCAD manually, the short-circuit will continue to draw current from the battery. When comparators P1 and P2 of module MD1 detect the critical voltage of 22 V, output amplifier APS of module MD1 trips circuit-breaker DCAD. As previously, bus B2 is isolated, circuit-breaker DCAD open-circuit and fault lamp DFT on, continuity being provided by modules MD1 and MD2. The battery supplies power to bus B1. The pilot knows that he has 30 minutes flight time remaining. To prevent damage to the electrical circuits connected to generator G the pilot open-circuits the excitation winding of generator G manually, using switch IE.

The various possible cases of short-circuiting or overloading of the battery or of the equipments connected to the battery will now be reviewed.

In the case of a dead short (low-impedance short-circuit) protective fuse F3 blows. The generator is de-excited. As a result, the equipments connected to the various secondary buses are no longer supplied with power. Coil BL is de-energized, which opens contact CL and closes contact CD. Once fuse F3 has blown, generator G is automatically re-excited. The contacts of circuit-breaker DCAD remain closed during these events. As the battery was out of service due to the short-circuit and as the generator was out of service due to the lack of excitation, module MD1 was not supplied with power. Re-excitation of the generator again feeds power to buses B1 and B2. The battery fault indicator DFB is then energized through contact d of switch CC and contact CD, which is closed since coil BL is no longer energized by the battery and cannot be energized from the generator, contact CL being open.

In the case of a dead short beyond contact CL or on bus B1 or in any of the equipments connected to it, generator G is de-excited. This represents a total loss of power, preventing lamp DFT coming on. The short-circuit on bus B1 discharges the battery and coil BL controlling contacts CL and CD is no longer energized.

A serious problem may occur in the form of "beating". The opening of contact CL isolates the short-circuit from the battery and coil BL is again energized, closing contact CL. Thus the short-circuit can again draw current from the battery, this phenomenon repeating and constituting a serious fire hazard. To overcome this problem, coil BL is shunted by a capacitor C, the purpose of which is to maintain contact CL closed until fuse F3 has blown. Contact CL is then open as coil BL is no longer energized. This also causes contact CD to close. In this case, automatic re-excitation of the generator is not possible, as both terminals are grounded. The pilot must then trip circuit-breaker DCAD manually, to isolate bus B1 and the short-circuit. In this case the generator is re-excited automatically. Bus B2, fault lamp DFT and indicator DFB are then supplied from generator G.

In the case of a high-impedance short-circuit which does not blow fuse F3 or open the relevant one of circuit-breakers DJ1$_1$ to DJ1$_N$, comparators P1 and P2 of module MD1 detect the voltage drop on the contacts of circuit-breaker DCAD. The pilot can then use voltmeter V and switch I to check that there is an overload on bus B1. The pilot then opens switch CC to open contact CL and prevent the battery discharging through the short-circuit.

In all cases where the battery or circuits connected to it are short-circuited, the flight equipments of the aircraft will operate for an unlimited duration as they are powered from the generator.

If the short-circuit is on one of the secondary buses, this is isolated by means of the corresponding circuit-breaker DJ.

When pushbutton BPD is pressed to start the motor, comparators P1 and P2 are disabled via terminal H of module MD1, which is connected to one terminal of pushbutton BPD and to the comparators.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. Security electrical power distribution system for light aircraft equipped for flight on instruments and having at least one navigation system comprising a main instrument and a standby instrument, said power distribution system comprising a battery, a generator, a battery bus and a generator bus connected to respective instruments of the or each navigation system, a remote-controlled circuit-breaker interconnecting said buses, and a fault detector with two control inputs connected to respective terminals of said circuit-breaker, one power feed input connected to said battery and another power feed input connected to said generator.

2. Power distribution system according to claim 1, further comprising a single fault indicator and a module monitoring the generator output voltage, said fault indicator being operative in response to input from said fault detector or said monitor module.

3. Power distribution system according to claim 1, further comprising a line switch connected between said battery and said battery bus, a coil which operates said line switch and a capacitance shunting said coil.

4. Power distribution system according to claim 1, wherein said fault detector comprises two comparators, one connected to said battery bus and the other to said generator bus, a reference circuit applying a reference voltage to said comparators, and an output amplifier controlled by said comparators, said remote-controlled circuit-breaker having an operating coil to which said output amplifier is connected.

5. Power distribution system according to claim 4, wherein said remote-controlled circuit-breaker further comprises a switch connected between said operating coil of the circuit-breaker and ground, the side of said switch connected to said coil being also connected to said fault detector.

6. Power distribution system according to claim 5, wherein said remote-controlled circuit-breaker is disposed on a control panel of the aircraft and incorporates a manual control accessible to the pilot.

7. Power distribution system according to claim 4, wherein means are provided for disabling said comparators during starting up.

8. Power distribution system according to claim 1, wherein means are provided for disabling said fault detector during starting up.

* * * * *